UNITED STATES PATENT OFFICE.

WILLIAM TRINDER, OF PHILADELPHIA, PENNSYLVANIA.

IMPROVEMENT IN MEDICAL COMPOUNDS FOR LUNG AND OTHER DISEASES.

Specification forming part of Letters Patent No. 132,119, dated October 8, 1872; reissue No. 5,254, dated January 21, 1873.

*To all whom it may concern:*

Be it known that I, WILLIAM TRINDER, of the city of Philadelphia, county of Philadelphia and State of Pennsylvania, have invented a new and valuable composition of matter, or medical compound useful in the treatment of lung and other diseases; and I do hereby decare that the following is a full, clear, and exact description of the same.

My invention consists, primarily and essentially, in the combination of lacto-phosphate of lime and cod-liver oil.

In order to prevent the oil and lacto-phosphate from separating I employ gum arabic, as hereinafter stated, or sugar may be substituted for part of the gum. To make an emulsion of the mixture I use lime-water, which gives the requisite fluidity and imparts the beneficial properties of the lime which it contains. To these I add glycerine, which possesses preserving and nutritive properties, and oil myrrhbane to give a pleasant flavor.

In preparing my compound I use the materials in the following proportions: Lactic acid, eight ounces; phosphate of lime, eight ounces; gum arabic, sixteen ounces; sugar, sixteen ounces; glycerine, twelve ounces; cod-liver oil, two quarts; lime-water, one pint; oil myrrhbane, one-half ounce.

These are compounded as follows: Dissolve the phosphate of lime in the lactic acid; then take the sugar and gum-arabic, mix these two thoroughly in a mortar, and add the already prepared lacto-phosphate of lime, and then gradually the cod-liver oil; when well mixed, add the lime-water; and, lastly, the glycerine and oil myrrhbane.

This improved compound is intended as a medicine to be used principally for diseases of the lungs, though it may be taken with advantage for other complaints, and will be found very beneficial in building up constitutions which have been impaired by sickness or other cause.

I claim—

1. The combination of lacto-phosphate of lime and cod-liver oil.
2. In combination with the elements of the first claim, the use of gum arabic, for the purpose set forth.
3. Lacto-phosphate of lime and cod-liver oil prepared as an emulsion, substantially as set forth.
4. The above-described compound composed of the ingredients substantially as set forth.

In testimony that I claim the foregoing I have hereunto subscribed my name in the presence of two witnesses.

WILLIAM TRINDER.

Witnesses:

GEO. C. SHELMERDINE,
M. DANL. CONNOLLY.